United States Patent [19]
Nakano

[11] Patent Number: 6,052,405
[45] Date of Patent: Apr. 18, 2000

[54] SPREAD SPECTRUM RECEIVER FOR USE IN COMMUNICATION SYSTEMS

[75] Inventor: Takayuki Nakano, Kawasaki, Japan

[73] Assignee: Matsushita Electric Industrial Company, Ltd., Osaka, Japan

[21] Appl. No.: 08/975,920

[22] Filed: Nov. 21, 1997

[30] Foreign Application Priority Data

Nov. 25, 1996 [JP] Japan ................................. 8-328016

[51] Int. Cl.⁷ ............................. H04B 15/00; H04B 7/10; H04B 1/10; H04B 7/216
[52] U.S. Cl. ........................ 375/200; 375/347; 375/349; 370/342
[58] Field of Search .................................. 375/200, 210, 375/208, 347, 349; 370/342

[56] References Cited

U.S. PATENT DOCUMENTS

| | | | |
|---|---|---|---|
| 4,608,701 | 8/1986 | Burgers et al. | 375/200 |
| 4,901,307 | 2/1990 | Gilhousen et al. | 370/320 |
| 5,109,390 | 4/1992 | Gilhousen et al. | 370/335 |
| 5,889,815 | 3/1999 | Iwakiri | 375/205 |

*Primary Examiner*—Chi H. Pham
*Assistant Examiner*—Khai Tran
*Attorney, Agent, or Firm*—Lowe Hauptman Gopstein Gilman & Berner

[57] ABSTRACT

A spread spectrum receiver for use in a mobile communication system is provided which includes a plurality of spread spectrum demodulators, a diversity combiner, a power level detector, a correlation determining circuit, a signal combination determining circuit, and a demodulator phase control circuit.

The correlation determining circuit determines correlation among input multipath signals transmitted through different transmission paths. The signal combination determining circuit selects the same number as that of the spread spectrum demodulators out of the multipath signals, which minimizes a drop in power level of a diversity combined signal outputted from the diversity combiner according to the determined correlation. The demodulator phase control circuit controls phases of demodulating operations of the spread spectrum demodulators to demodulate the selected multipath signals, respectively.

15 Claims, 7 Drawing Sheets

SPREAD SPECTRUM RECEIVER FOR USE IN COMMUNICATION SYSTEMS

BACKGROUND OF THE INVENTION

1. Technical Field of the Invention

The present invention relates generally to a spread spectrum receiver for use in communication system, and more particularly to an improved circuit structure of a spread spectrum receiver for cellular telephone systems which is designed to select input signals suitable for diversity combining out of multipath signals traveling on different transmission paths.

2 Background of Related Art

In recent years, there is an increasing need for terrestrial mobile communications such as cellular telephone systems, and techniques of improving spectrum efficiency are becoming important to increase a user capacity within a limited frequency band. As one of multiple access techniques, code division multiple access (CDMA) is proposed. CDMA can realize high-quality communication by means of spread spectrum communication techniques using sharp correlation properties with respect to a pseudo noise sequence within a wide band. The use of CDMA techniques in terrestrial mobile communication systems is disclosed in U.S. Pat. No. 4,901,307 to Gilhousen et al., issued on Apr. 28, 1992, disclosure of which is incorporated herein by reference. In spread spectrum communications using a direct sequence system, multi-path components are subjected to Maximal-Ratio Combining in a receiver called a rake receiver in order to enhance the diversity effects. The rake receiver is disclosed in, for example, U.S. Pat. No. 5,109,390, disclosure of which is incorporated therein by reference.

FIG. 7 shows a conventional spread spectrum communication system using the direct sequence.

A transmit data signal 49 is inputted to an information modulator 50. The information modulator 50 outputs a narrowband signal having a bandwidth required only for transmitting the data signal 49. The bandwidth of an output of a spreading code generator 51 is much wider than that of the output of the information modulator 50. The spread spectrum modulator 52 multiplies the output from the information modulator 50 by a spreading signal such as a pseudo noise sequence outputted from the spreading code generator 51 to spread the narrowband signal over a broader bandwidth and outputs it through the transmitter antenna 53. In a receiver, the spread spectrum demodulator 56 changes a wideband signal received by the receiver antenna 54 into a narrowband signal. This conversion is accomplished by multiplying the received wideband signal by a spreading code outputted from a spreading code acquisition circuit 55 which is the same as that outputted by the spreading code generator 51.

Usually, an interference signal caused by a signal outputted from another transmitter or thermal noise is, as shown in FIG. 7, added to the transmit signal in the course of transmission. The use of the spreading code provided by the spreading code acquisition circuit 55 having a much smaller cross-correlation to the interference signal, however, results in a decrease in interference component of the output from the spread spectrum demodulator 56.

In general, a mobile communication network is, as shown in FIG. 8(a), subject to multipath. The mobile station 60 receives a direct wave transmitted directly from the base station 59 through the transmission path 62 and also receives a delayed wave reflected from the building 61 through the transmission path 63. FIG. 8(b) shows power levels of the direct wave and the delayed wave. In the receiver, demodulation of a signal transmitted from particular one of the paths is achieved by matching the timing with which the spread spectrum demodulator 56 operates, that is, the phase of the in spreading code produced by the spreading code acquisition circuit 55 to that of the signal from that path. In such multipath communications, a delayed wave interferes with a direct wave.

The so-called rake receiver includes a plurality of spread spectrum demodulators which operate with different timings to perform path diversity combining of received signals.

FIG. 9 shows a spread spectrum demodulator circuit of the rake receiver. FIG. 10 shows power levels of signals arriving at the receiver at different times $t_0$, $t_1$, $t_2$, $t_3$, and $t_4$ from different directions.

The path level detector 12 determines power levels of received waves 1 (i.e., multipath signals 16 to 20) and phases thereof. The phase assignment circuit 14 determines phases of modulating operations (i.e., signal reception timings) of the spread spectrum demodulators 2 to 5, respectively, based on the output 13 from the path level detector 12. This phase determination is made so as to allow the rake receiver to perform maximal-ratio combining of the received signals 1.

A mobile communication network may experience Rayleigh fading so that the power level of each multipath signal drops momentarily. Each faded multipath signal changes in power level over 20 dB. The rake receiver minimizes deterioration in reception quality by combining such faded multipath signals, which is commonly called Path Diversity.

The above conventional spread spectrum demodulator circuit, however, has the drawback in that changes in power level of the multipath signals due to Rayleigh fading may preclude maximal-ratio combining in the diversity combiner 10, resulting in deterioration in signal reception quality.

An example of such a problem will be discussed below with reference to FIGS. 11 and 12. For the brevity of explanation, it is assumed that three multipath signals A, B, and C have arrived at the receiver in FIG. 9, and the receiver has only two spread spectrum demodulators 2 and 3.

FIG. 11 shows variations in power level of the multipath signals A, B, and C. FIG. 12 shows variations in power level of combined signals. Numeral 69 indicates the power level of the signal into which the multipath signals A and B are combined. Numeral 70 indicates the power level of the signal into which the multipath signals B and C are combined. Numeral 71 indicates the power level of the signal into which the multipath signals C and A are combined.

It is known that typical mobile communications may experience fading so that the amplitude of received signals change irregularly according to a Rayleigh distribution, but this change will be expressed here in a sine signal for the simplicity of explanation.

Average values of the power level 66, 67, and 68 of the multipath signals A, B, and C are, as shown in table 1 below, 1.7, 1.6, and 1.5, respectively. Therefore, if the phase assignment to the spread spectrum demodulator 2 and 3 is made based on the magnitudes of the averaged values of the power levels of the multipath signals 66 to 68, then components of the multipath signals A and B are combined in the diversity combiner 10. The combination of the multipath signals A and B is, however, unsuitable from the point of view of a drop in power level after diversity combining. The signal into which the multipath signals A and B are combined, as indicated at 69 in FIG. 12, drops in power level near time 4 and 10. This level drop will result in fatal deterioration in communication quality. The combination of the multipath signals A and C results in a smaller drop in power level as compared with the combination of the multipath signals A and B.

Such a drop in signal level after diversity combining is caused by a high correlation between multipath signals to be combined.

The correlation between multipath signals usually depends upon conditions of transmission paths. Particularly, in the case of mobile communications, the correlation changes momentarily and is impossible to estimate. It is known that when a difference in phase between multipath signals is small, the correlation is usually high, while when the difference in phase is great, the correlation is low, but the relation between the phase difference and the correlation depends upon a propagation environment and is difficult to estimate.

TABLE 1

|  | multipath A | multipath B | multipath C |
| --- | --- | --- | --- |
| average | 1.70 | 1.60 | 1.50 |
| square of aver. | 2.89 | 2.56 | 2.25 |
| means square | 3.39 | 3.07 | 2.75 |
| auto-cross correlation | 0.50 | 0.50 | 0.50 |

SUMMARY OF THE INVENTION

It is therefore a principal object of the present invention to avoid the disadvantages of the prior art.

It is another object of the present invention to provide a spread spectrum receiver which is designed to select input signals suitable for diversity combining out of multipath signals traveling on different transmission paths.

According to one aspect of the present invention, there is provided a spread spectrum receiver for use in a communication system which comprises: (a) a plurality of spread spectrum demodulators demodulating inputted multipath signals transmitted through multiple transmission paths in the form of spread spectrum waves having different phases to provide demodulated signals, respectively; (b) a diversity combiner combining the demodulated signals to produce a diversity combined signal; (c) a power level detector detecting power levels of the multipath signals, respectively; (d) a correlation determining means for determining correlation among the multipath signals; (e) a selecting means selecting the same number as that of the spread spectrum demodulators out of the multipath signals, which minimizes a drop in power level of the diversity combined signal according to the correlation determined by the correlation determining means; and (f) a phase determining circuit determining phases of demodulating operations of the spread spectrum demodulators so that the multipath signals selected by the selecting means undergo demodulation in the spread spectrum demodulators, respectively.

In the first preferred mode of the invention, the correlation determining means determines a cross-correlation value in each of all possible combinations of any two of the multipath signals. The selecting means selects as many multipath signals as the number of the spread spectrum demodulators in the order of showing a smaller cross-correlation value and a greater power level.

The selecting means removes a smaller in power level of one of the combinations showing the greatest cross-correlation value to select as many multipath signals as the number of the spread spectrum demodulators.

If there are left the multipath signals greater in number than the spread spectrum demodulators after the smaller in power level of one of the combinations showing the greatest cross-correlation value is removed, a smaller in power level of one of the combinations showing the second greatest cross-correlation value is removed to select as many multipath signals as the number of the spread spectrum demodulators.

In the second preferred mode of the invention, the correlation determining means determines a co-variance value in each of all possible combinations of any two of the multipath signals.

The selecting means selects as many multipath signals as the number of the spread spectrum demodulators in the order of showing a smaller co-variance value and a greater power level.

The selecting means removes a smaller in power level of one of the combinations showing the greatest co-variance value to select as many multipath signals as the number of the spread spectrum demodulators.

In the third preferred mode of the invention, the correlation determining means determines a correlation factor in each of all possible combinations of any two of the multipath signals. The selecting means selects as many multipath signals as the number of the spread spectrum demodulators in the order of showing a smaller correlation factor and a greater power level.

The selecting means removes a smaller in power level of one of the combinations showing the greatest correlation factor to select as many multipath signals as the number of the spread spectrum demodulators.

In the fourth preferred mode of the invention, the selecting means includes a combined level calculator and a worst signal combination determining circuit. The combined level calculator determines the sum of the power levels in each of all possible combinations of the same number of the multipath signals as that of the spread spectrum demodulators to provide a total power level. The worst signal combination determining circuit determines frequencies of drops in total power level of the combinations below a given level to select as many multipath signals as the number of the spread spectrum demodulators in the order of showing a lower frequency and a greater power level.

The selecting means determines and excludes one of the combinations showing the highest frequency to select as many multipath signals as the number of the spread spectrum demodulators ultimately.

In the fifth preferred mode of the invention, the selecting means includes a combined level calculator and a variance calculator. The combined level calculator determines the sum of the power levels in each of all possible combinations of the same number of the multipath signals as that of the spread spectrum demodulators to provide a total power level. The variance calculator determines variance values of the total power levels of the combinations over a given sampling cycle to select as many multipath signals as the number of the spread spectrum demodulators in the order of showing a smaller variance value and a greater power level.

The selecting means determines and excludes one of the combinations showing the greatest variance value to select as many multipath signals as the number of the spread spectrum demodulators ultimately.

In the sixth preferred mode of the invention, the correlation determining means determines a time difference between times at which minimum values in each of all possible combinations of any two of the multipath signals appear. The selecting means selects as many multipath signals as the number of the spread spectrum demodulators in the order of showing a greater time difference and a greater power level.

The selecting means determines and excludes one of the combinations showing a smaller time difference in sequence to select as many multipath signals as the number of the spread spectrum demodulators.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
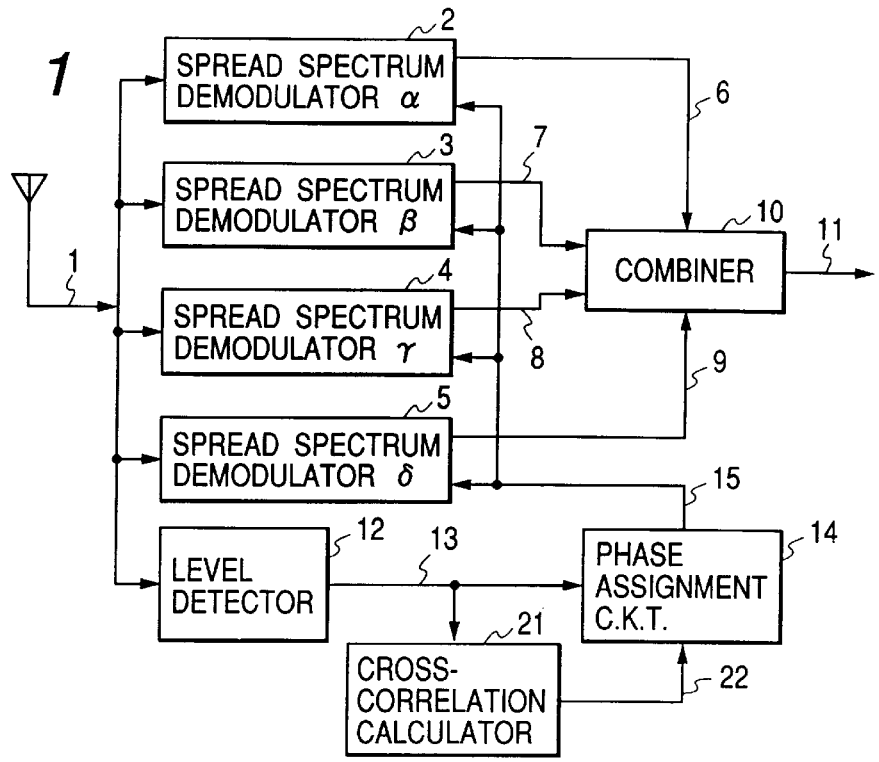
FIG. 1 is a circuit diagram which shows a spread spectrum receiver according to the first embodiment of the invention.

Referring now to the drawings, wherein like reference numbers refer to like parts throughout several views, particularly to FIG. 1, there is shown a spread spectrum receiver according to the first embodiment of the invention which is a modification of a typical rake receiver for utilization in mobile communication systems such as a cellular telephone system.

The spread spectrum receiver includes the spread spectrum demodulators 2 to 5, the diversity combiner 10, the path level detector 12, the phase assignment circuit 14, and the cross-correlation calculator 21.

The spread spectrum demodulators 2 to 5 despread spread spectrum communication signals 1 (also referred to as multipath signals, hereinbelow) transmitted through multiple paths with different transmission delays to produce demodulated signals 6 to 9 respectively. The diversity combiner 10 performs maximal-ratio combining of the demodulated signals 6 to 9 to produce a combined signal 11. The path level detector 12 performs spread spectrum demodulation on the multipath signals 1 to determine the power levels and phases thereof, respectively, and provides level signals 13 indicative thereof to the phase assignment circuit 14 and the cross-correlation calculator 21. The cross-correlation calculator determines, as will be described later in detail, cross-correlation between any two of the multipath signals 1 based on the level signals 13 from the path level detector 12 and provides cross-correlation values 22 to the phase assignment circuit 14. The phase assignment circuit 14 determines the timing or phase of a modulating operation (i.e., a signal reception timing) of each of the spread spectrum demodulators 2 to 5 based on the cross-correlation value 22 and the level signal 13 and provides a phase control signal 15 thereto. Specifically, the phase assignment circuit 14 controls the operations of the spread spectrum demodulators 2 to 5 so that desired four of the multipath signals 1 may be demodulated in the four spread spectrum demodulators 2 to 5, respectively, for minimizing a fading-caused drop in power level of the output 11 of the diversity combiner 10. The four multipath signals are, as will be discussed later in detail, selected basically in the order of showing a smaller cross-correlation value and a greater power level.

Figure 11:
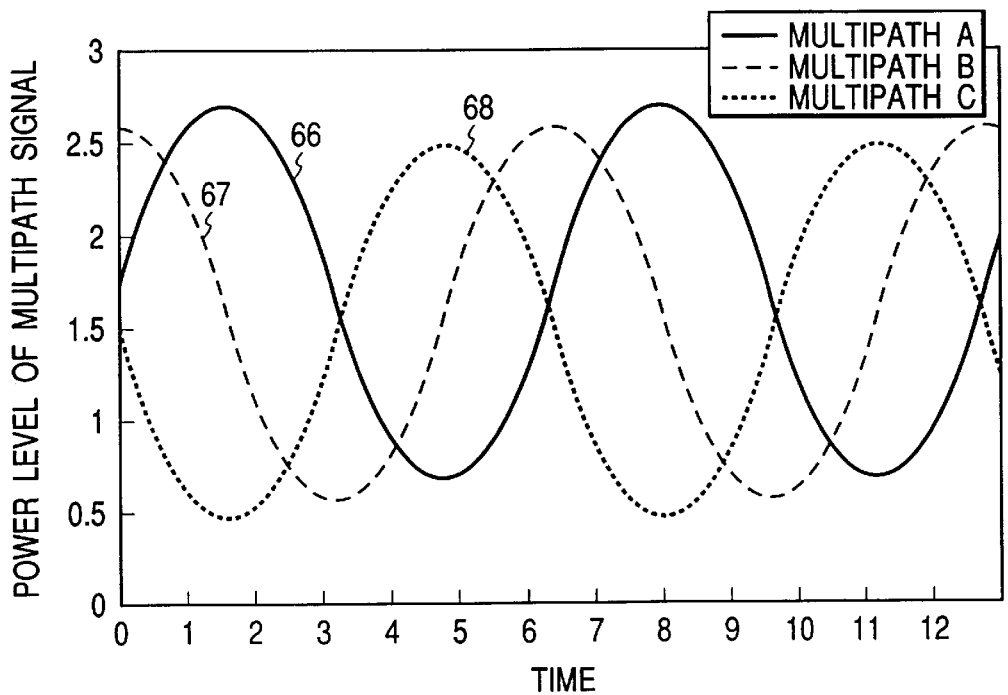
FIG. 11 is a graph which shows power levels of multipath signals A, B, and C.

An operation of the spread spectrum receiver of this embodiment will be discussed below with reference to FIGS. 11 and 12 and tables 1 and 2.

Average values of the power levels 66, 67, and 68 of the multipath signals A, B, and C, as shown in table 1, are 1.7, 1.6, and 1.5. Cross-correlation values in combinations (A, B), (B, C) and (C, A) of multipath signals A and B, multipath signals B and C, and multipath signals C and A are 2.72, 2.40, and 2.05, respectively. A cross-correlation value R(X, Y) in a combination of power levels X and Y, in general, may be given by the following equation.

$$R(X, Y) = E[X \cdot Y] \quad (1)$$

where E [−] indicates an average value.

The averaging cycles (i.e., sampling cycles) must be set much longer than cycles of power level variations due to fading. A fading pitch may be monitored to determine the averaging cycles. In the case of rapid fading, the averaging cycles may be shortened, while in the case of slow fading, the averaging cycles may be lengthened.

A desired multipath pair to be combined in the diversity combiner 10 is determined based on the averaged values of the power levels of the multipath signals A, B and C and the cross-correlation values in the combinations (A, B), (B, C), and (C, A) of the multipath signals A, B, and C. This determination may be made in the phase assignment circuit 14 so as to select one of the all possible combinations (A, B), (B, C), and (C, A) showing the smallest cross-correlation value. The combination (C, A) is thus selected.

Figure 12:
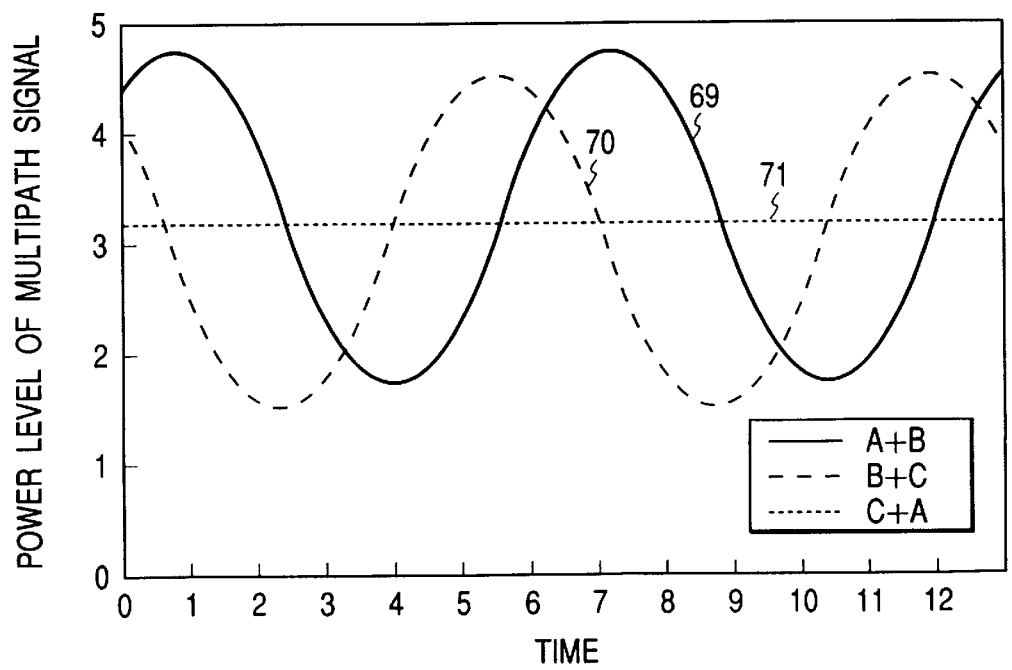
FIG. 12 is a graph which shows power levels of combined multipath signals.

The combination (C, A) of the multipath signals C and A, as indicated at numeral 71 in FIG. 12, results almost no drop in power level.

The above discussion refers to an example using the two spread spectrum demodulators for the three multipath signals A, B, and C for convenience of explanation, but the present invention does not limit the number of spread spectrum demodulators which are used. For example, four spread spectrum demodulators may be provided for five multipath signals. In this case, the number of all possible combinations of any two of the five multipath signals are ten ($10 = {}_5C_2$), and a total of ten co-variance values are calculated. One of the ten combinations of the multipath signals showing the greatest cross-correlation value is selected, and one of the multipath signal pair of the selected combination showing a smaller power level is removed to select desired four of the five multipath signals ultimately. The spread spectrum demodulators are controlled so as to process the four selected multipath signals.

Figure 2:
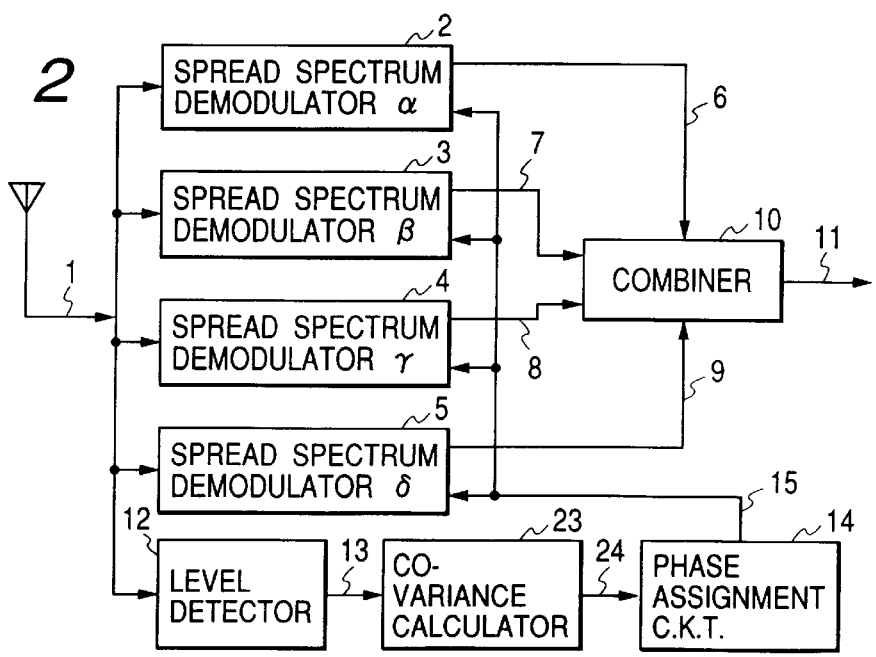
FIG. 2 is a circuit diagram which shows a spread spectrum receiver according to the second embodiment of the invention.

FIG. 2 shows a spread spectrum receiver according to the second embodiment which is different from the first embodiment only in that a co-variance calculator 23 is disposed between the path level detector 12 and the phase assignment circuit 14. Other arrangements are identical, and explanation thereof in detail will be omitted here.

The co-variance calculator 23 receives the level signals 13 indicating the power levels of the multipath signals 1 outputted from the path level detector 12 to determine co-variance values of all possible combinations of any two of the multipath signals 1, as described below in detail, and provides co-variance signals 24 indicative thereof to the phase assignment circuit 14. The phase assignment circuit 14 controls the operations of the spread spectrum demodulators 2 to 5 so that desired four of the multipath signals 1 may be demodulated in the four spread spectrum demodulators 2 to 5, respectively, for minimizing a fading-caused drop in power level of the output 11 of the diversity combiner 10. The four multipath signals are, as will be discussed later in detail, selected basically in the order of showing a smaller co-variance value and a greater power level.

An operation of the spread spectrum modulation apparatus will be discussed below with reference to FIGS. 11 and 12 and tables 1 and 2.

Co-variance values of all possible combinations, that is, combinations (A, B), (B, C) and (C, A) of the multipath signals A to C are determined based on the power levels 66, 67, and 68 of the multipath signals A, B, and C. A co-variance value C(X, Y) of a combination of power levels X and Y, in general, may be given by the following equation.

$$C(X, Y) = E[(X - E[X]) \cdot (Y - E[Y])] \quad (2)$$

where E [–] indicates an average value.

The co-variance values of the combinations (A, B), (B, C) and (C, A) are, as shown in table 2 below, are 0.00, 0.00, and –0.50, respectively. The averaging cycles must be determined to be much longer than cycles of power level variations due to fading. A fading pitch may be monitored to determine the averaging cycles. In the case of rapid fading, the averaging cycles may be shortened, while in the case of slow fading, the averaging cycles may be lengthened.

A multipath signal pair having the smallest co-variance value consists of the multipath signals C and A. This combination, as indicated at numeral 71 in FIG. 12, results almost no drop in power level.

TABLE 2

|  | (A, B) | (B, C) | (C, A) |
| --- | --- | --- | --- |
| correlation | 2.72 | 2.40 | 2.05 |
| co-variance | 0.00 | 0.00 | –0.50 |

TABLE 2-continued

|  | (A, B) | (B, C) | (C, A) |
| --- | --- | --- | --- |
| correlation factor | 0.00 | 0.00 | –1.00 |
| after combining minimum value | 1.89 | 1.69 | 3.20 |
| after combining variance | 1.00 | 1.00 | 0.00 |
| time difference | 1.57 | 1.57 | 3.14 |

The above discussion refers to an example using the two spread spectrum demodulators for the three multipath signals A, B, and C for convenience of explanation, but the present invention does not limit the number of spread spectrum demodulators which are used. For example, three spread spectrum demodulators may be provided for five multipath signals. In this case, the number of all possible combinations of any two of the five multipath signals are ten ($10 = {}_5C_2$), and a total of ten co-variance values are calculated. One of the ten combinations of the multipath signals showing the greatest co-variance value is selected, and the smaller in power level of the multipath signal pair of the selected combination is removed. Next, one of the combinations of the multipath signals showing the second greatest co-variance value is selected, and the smaller in power level of the multipath signal pair of the selected combination is removed to select three of the five multipath signals ultimately. The spread spectrum demodulators are controlled so as to process the three selected multipath signals.

Figure 3:
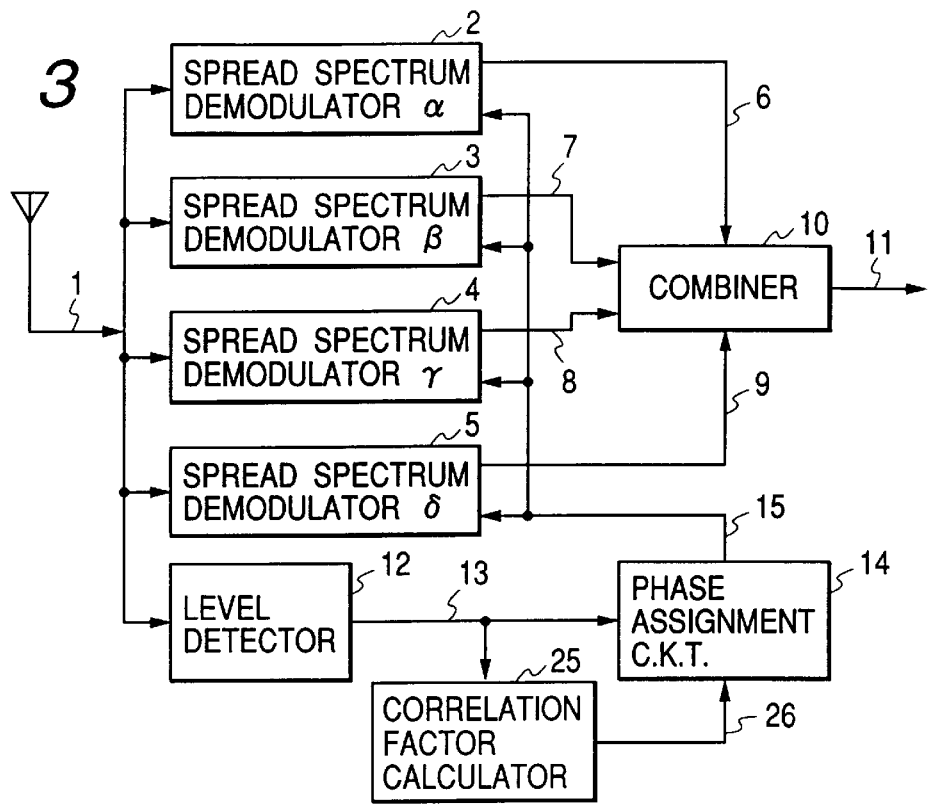
FIG. 3 is a circuit diagram which shows a spread spectrum receiver according to the third embodiment of the invention.

FIG. 3 shows a spread spectrum receiver according to the third embodiment which is different from the first embodiment only in that a correlation factor calculator 25 is provided between the path level detector 12 and the phase assignment circuit 14. Other arrangements are identical, and explanation thereof in detail will be omitted here.

The correlation factor calculator 25 receives the level signals 13 indicating the power levels of the multipath signals 1 outputted from the path level detector 12 to determine correlation factors of all possible combinations of any two of the multipath signals 1, as described below in detail, and provides correlation factor signals 26 indicative thereof to the phase assignment circuit 14. The phase assignment circuit 14 controls the operations of the spread spectrum demodulators 2 to 5 so that desired four of the multipath signals 1 may be demodulated in the four spread spectrum demodulators 2 to 5, respectively, for minimizing a fading-caused drop in power level of the output 11 of the diversity combiner 10. The four multipath signals are, as will be discussed later in detail, selected basically in the order of showing a smaller correlation value and a greater power level.

An operation of the spread spectrum modulation apparatus will be discussed below with reference to FIGS. 11 and 12 and tables 1 and 2.

The correlation factor calculator 25 determines correlation factors of all possible combinations, that is, combinations (A, B), (B, C) and (C, A) of the multipath signals A to C based on the power levels 66, 67, and 68 of the multipath signals A, B, and C. A correlation factor r(X, Y) of power levels X and Y, in general, may be determined according to the equation below.

$$r(X, Y) = C(X, Y) / (V(X) \cdot V(Y))^{1/2} \quad (3)$$

where C(–, –) indicates a co-variance value, and V(–) indicates a variance value.

The correlation factors of the combinations (A, B), (B, C) and (C, A) are, as shown in table 2, are 0.00, 0.00, and −1.00, respectively. The averaging cycles in determining the co-variance value and the variance value must be set much longer than cycles of power level variations due to fading. A fading pitch may be monitored to determine the averaging cycles. In the case of rapid fading, the averaging cycles may be shortened, while in the case of slow fading, the averaging cycles may be lengthened.

A multipath signal pair having the smallest correlation factor consists of the multipath signals C and A. This combination, as indicated at numeral 71 in FIG. 12, results almost no drop in power level, which improves communication quality.

The above discussion refers to an example using the two spread spectrum demodulators for the three multipath signals A, B, and C for convenience of explanation, but the present invention does not limit the number of spread spectrum demodulators which are used. For example, three spread spectrum demodulators may be provided for six multipath signals. In this case, the number of all possible combinations of any two of the sixth multipath signals are fifteen ($15 = {_6}C_2$), and a total of fifteen correlation factors are calculated. One of the fifteen combinations of the multipath signals showing the greatest correlation factor is selected, and the smaller in power level of the multipath signal pair of the selected combination is removed. Next, one of the combinations of the multipath signals showing the second greatest correlation factor is selected, and the smaller in power level of the multipath signal pair of the selected combination is removed. Similarly, one of the combinations of the multipath signals showing the third greatest correlation factor is selected, and the smaller in power level of the multipath signal pair of the selected combination is removed to select three of the six multipath signals (i.e., three desired multiple paths) ultimately. The spread spectrum demodulators are controlled so as to process the three selected multipath signals.

Figure 4:
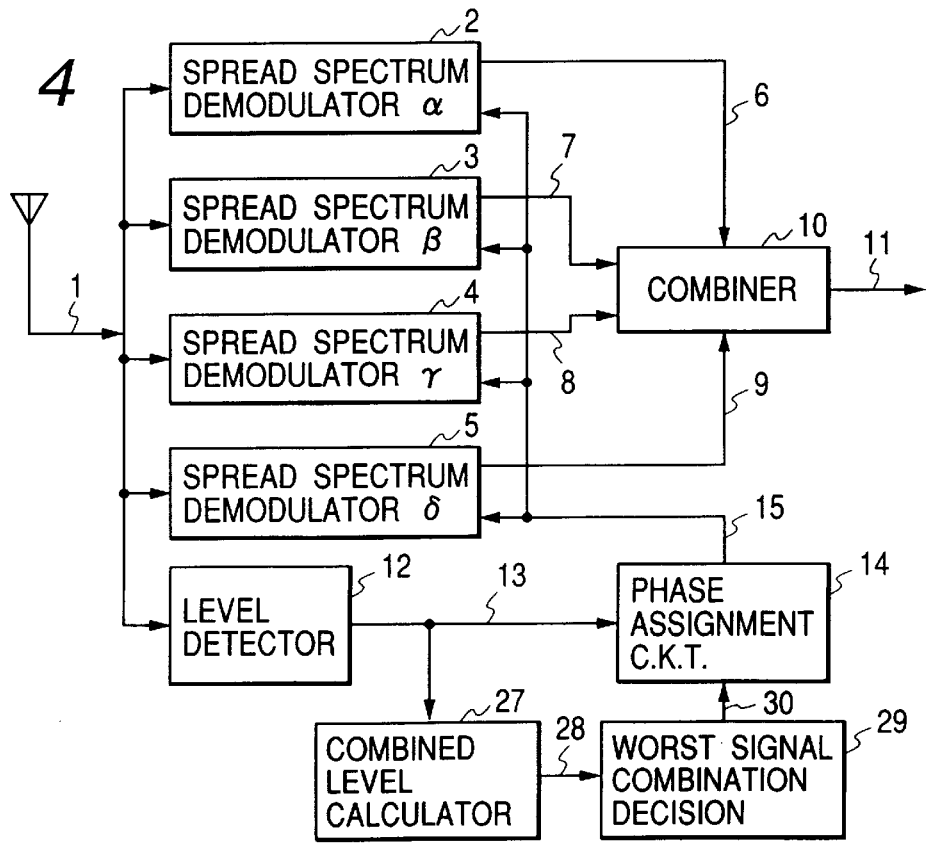
FIG. 4 is a circuit diagram which shows a spread spectrum receiver according to the fourth embodiment of the invention.

FIG. 4 shows a spread spectrum receiver according to the fourth embodiment which is different from the above embodiments in that a combined level calculator 27 and a worst signal combination determining circuit 29 are provided. Other arrangements are identical, and explanation thereof in detail will be omitted here.

The combined level calculator 27 receives the level signals 13 outputted from the path level detector 12 and determines the sum of power levels in each of all possible combinations of a number of candidate multipath signals which is equal to the number of the spread spectrum demodulators 2 to 5. Specifically, in FIG. 4, the number of the spread spectrum demodulators 2 to 5 is four (4). Thus, the combined level calculator 27 determines the total power level of each of all possible combinations of any four of input multipath signals 1 and provides a total power level signal 28 indicative thereof to the worst signal combination determination circuit 29.

The worst signal combination determination circuit 29 selects one of the all possible combinations which shows the highest frequency of drops in the total power level monitored over a given sampling cycle and provides the worst combination signal 30 indicative thereof to the phase assignment circuit 14.

The selection of the worst signal combination in the worst signal combination determination circuit 29 may be achieved by counting the number of times each of the total power levels determined in the combined level calculator 27 is decreased below a threshold value that is a power level required for ensuring a desired communication quality. Alternatively, one of the possible combinations which shows the smallest total power level may be selected as the worst combination signal 30. Two or more of the possible combinations which show total power levels within a given lower level range may also be selected as the worst combination signal 30.

The phase assignment circuit 14 receives the worst combination signal 30 to control the operations of the spread spectrum demodulators 2 to 5 so that desired four of the multipath signals 1 may be demodulated in the four spread spectrum demodulators 2 to 5, respectively, for minimizing a fading-caused drop in power level of the output 11 of the diversity combiner 10.

An operation of the spread spectrum modulation apparatus will be discussed below with reference to FIGS. 11 and 12 and tables 1 and 2.

The power levels of signals into which the multipath signals A to C are combined in the combinations (A, B), (B, C) and (C, A) are, as discussed above, indicated at numerals 69, 70, and 71 in FIG. 12. Of these power levels, the power levels 69 and 70 drop cyclically, and minimum values thereof are, as shown in table 2, 1.89 and 1.69. The combinations (A, B) and (B, C) are, thus, excluded to select the combination (C, A) for diversity combining.

Figure 5:
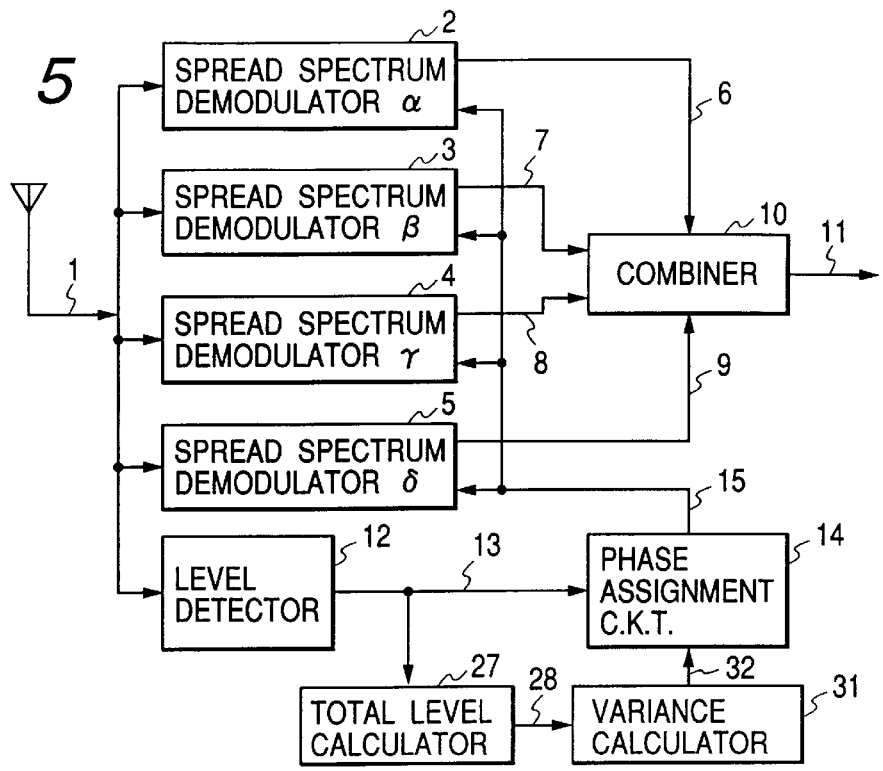
FIG. 5 is a circuit diagram which shows a spread spectrum receiver according to the fifth embodiment of the invention.

FIG. 5 shows a spread spectrum receiver according to the fifth embodiment which is different from the fourth embodiment in that a variance calculator 31 is provided between the combined level calculator 27 and the phase assignment circuit 14. Other arrangements are identical, and explanation thereof in detail will be omitted here.

The combined level calculator 27, as already mentioned in the above fourth embodiment, receives the level signals 13 outputted from the path level detector 12 and determines the sum of power levels in each of all possible combinations of a number of candidate multipath signals which is equal to the number of the spread spectrum demodulators 2 to 5. Specifically, in FIG. 5, the number of the spread spectrum demodulators 2 to 5 is four (4). Thus, the combined level calculator 27 determines the total power level of each of all possible combinations of any four of input multipath signals 1 and provides a total power level signal 28 indicative thereof to the variance calculator 31.

The variance calculator 31 determines a variance V(X) of each of the total power levels of all the combinations based on the total power level signals 28 according to the equation below and provides a variance signal 32 indicative thereof to the phase assignment circuit 14.

$$V(X) = E\left[(X - E[X])^2\right] \qquad (4)$$

where X is the total power level, and E[−] is an average value.

The averaging cycles in determining the variance V(X) must be set much longer than cycles of power level variations due to fading. A fading pitch may be monitored to determine the averaging cycles. In the case of rapid fading, the averaging cycles may be shortened, while in the case of slow fading, the averaging cycles may be lengthened.

The phase assignment circuit 14 receives the variance signals 32 to control the operations of the spread spectrum demodulators 2 to 5 so that desired four of the multipath signals 1 may be demodulated in the four spread spectrum demodulators 2 to 5, respectively, for minimizing a fading-caused drop in power level of the output 11 of the diversity combiner 10. The four multipath signals are, as will be discussed later in detail, selected basically in the order of showing a smaller variance value and a greater power level.

An operation of the spread spectrum modulation apparatus will be discussed below with reference to FIGS. 11 and 12 and tables 1 and 2.

The power levels (i.e., the total power levels) of signals into which the multipath signals A to C are combined in the combinations (A, B), (B, C) and (C, A) are, as discussed above, indicated at numerals 69, 70, and 71 in FIG. 12. The variance values of the power levels 69 to 71 are, as shown in table 2, 1.00, 1.00, and 000. The combinations (A, B) and (B, C) are, thus, excluded because their variance values are greater to select the combination (C, A). Specifically, the multipath signals A and C are selected for diversity combining.

Figure 6:
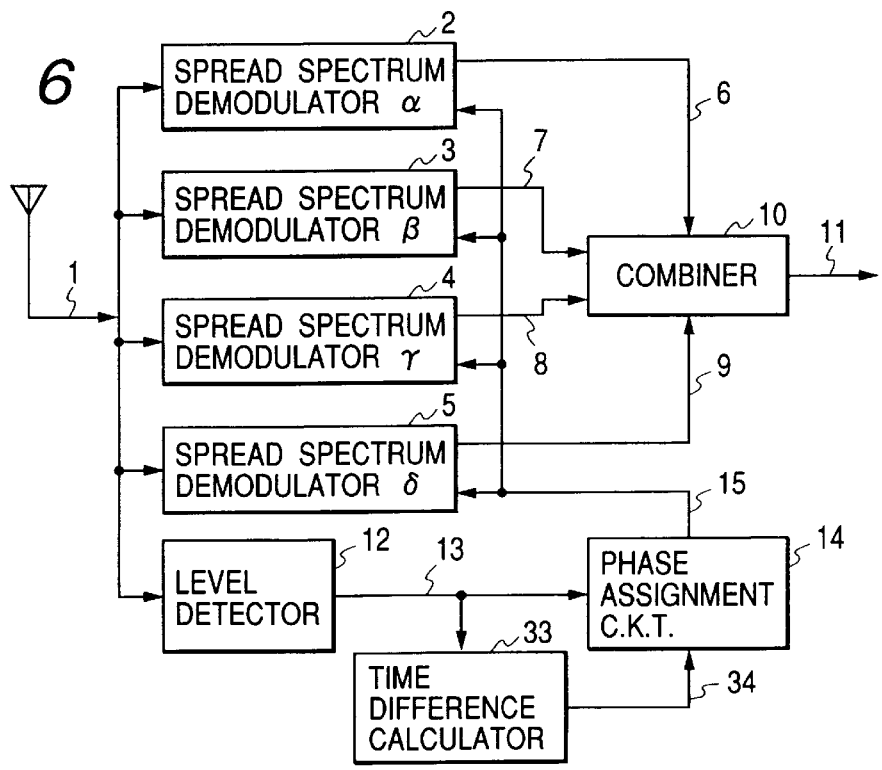
FIG. 6 is a circuit diagram which shows a spread spectrum receiver according to the sixth embodiment of the invention.
Figure 7:
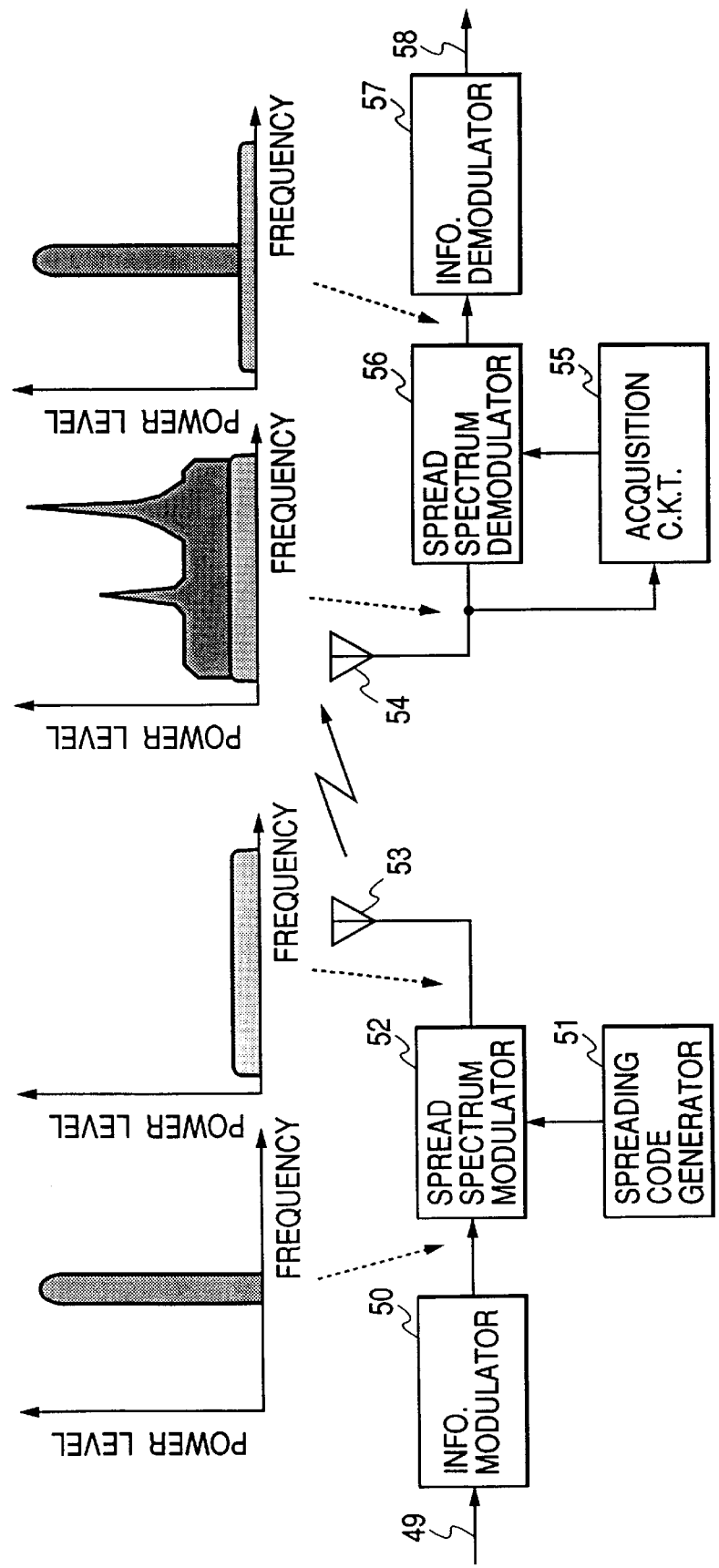
FIG. 7 is an illustration which shows a conventional spread spectrum communication system using the direct sequence.
Figure 8B:
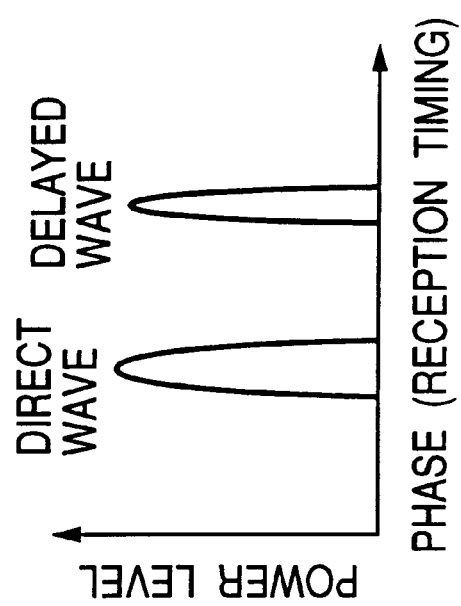
FIG. 8(b) is a graph which shows power levels of a direct wave and a delayed wave.
Figure 8A:
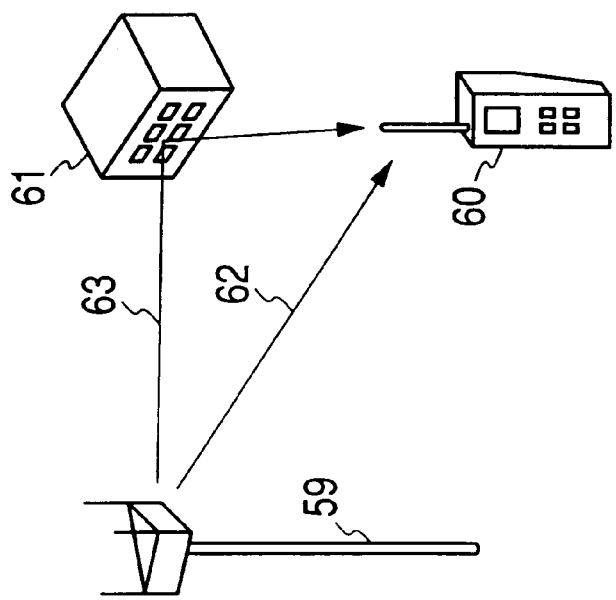
FIG. 8(a) is an illustration which shows multiple transmission paths in a mobile communication network.
Figure 9:
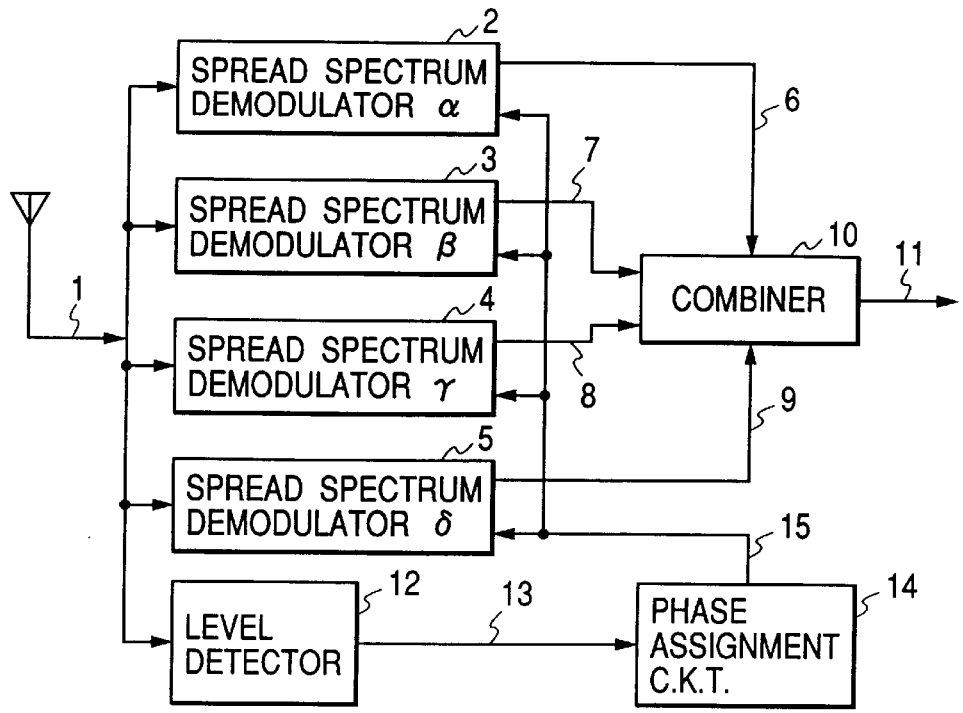
FIG. 9 is a block diagram which shows a conventional rake receiver.
Figure 10:
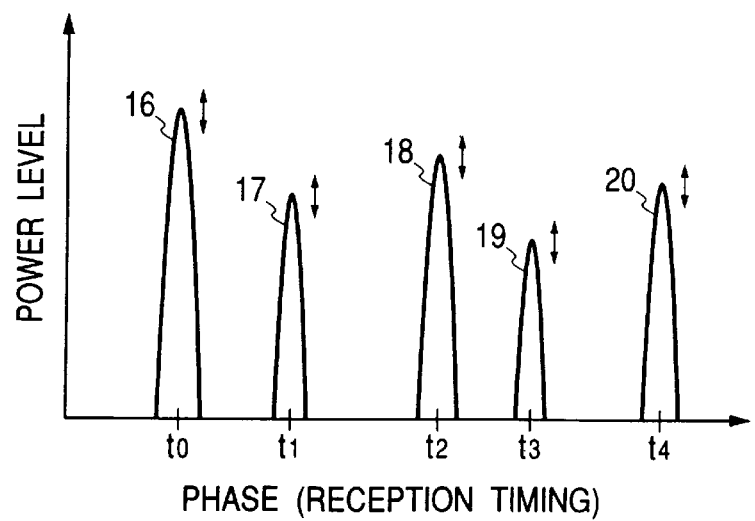
FIG. 10 is a graph which shows power levels of multipath signals arriving at a receiver in different phases.

FIG. 6 shows a spread spectrum receiver according to the sixth embodiment which is different from the above embodiments in that an inter-minimum value time difference calculator 33 is provided between the path level detector 12 and the phase assignment circuit 14. Other arrangements are identical, and explanation thereof in detail will be omitted here.

The inter-minimum value time difference calculator 33 monitors a time at which each of the multipath signals 1 shows a minimum level based on the power level signal 13 from the path level detector 12 and determines a time interval (referred to as an inter-minimum value time difference, hereinafter) between the times at which the minimum levels are shown in each of all possible combinations of any two of the multipath signals 1 to provide a time difference signal 34 indicative thereof to the phase assignment circuit 14.

The phase assignment circuit 14 receives the time difference signals 34 to control the operations of the spread spectrum demodulators 2 to 5 so that desired four of the multipath signals 1 may be demodulated in the four spread spectrum demodulators 2 to 5, respectively, for minimizing a fading-caused drop in power level of the output 11 of the diversity combiner 10. The four multipath signals are, as will be discussed later in detail, selected basically in the order of showing a greater inter-minimum value time difference and a greater power level.

An operation of the spread spectrum modulation apparatus will be discussed below with reference to FIGS. 11 and 12 and tables 1 and 2.

Average values of the power levels 66, 67, and 68 of the multipath signals A, B, and C, as shown in table 1, are 1.7, 1.6, and 1.5. The inter-minimum value time differences in the combinations (A, B), (B, C) and (C, A) are, as shown in table 2, 1.57, 1.57, and 3.14, respectively.

Two of the multipath signals A to B are selected for diversity combining based on the average values of the power levels 66, 67, and 68 and the inter-minimum value time differences in the combinations (A, B), (B, C) and (C, A). Specifically, since the inter-minimum value time differences of the combinations (A, B) and (B, C) which are 1.57 may be viewed to be small as compared with a fading cycle that is six (6) as shown in FIG. 12, these combinations are excluded to select the multipath signals A and C for diversity combining.

The above discussion refers to an example using the two spread spectrum demodulators for the three multipath signals A, B, and C for convenience of explanation, but the present invention does not limit the number of spread spectrum demodulators which are used. For example, four spread spectrum demodulators may be provided for six multipath signals. In this case, the number of all possible combinations of any two of the six multipath signals are fifteen (15=$_6C_2$), and a total of fifteen inter-minimum value time differences are calculated. One of the fifteen combinations of the multipath signals showing the smallest inter-minimum value time difference is selected, and the smaller in power level of the multipath signal pair of the selected combination is removed. Next, one of the combinations of the multipath signals showing the second smallest inter-minimum value time difference is selected, and the smaller in power level of the multipath signal pair of the selected combination is removed to select four of the six multipath signals for diversity combining.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A spread spectrum receiver for use in a communication system comprising:

a plurality of spread spectrum demodulators demodulating inputted multipath signals transmitted through multiple transmission paths in the form of spread spectrum waves having different phases to provide demodulated signals, respectively;

a diversity combiner combining the demodulated signals to produce a diversity combined signal;

a power level detector detecting power levels of the multipath signals, respectively;

correlation determining means for determining correlation among the multipath signals;

selecting means selecting the same number as that of said spread spectrum demodulators out of the multipath signals, which minimizes a drop in power level of the diversity combined signal according to the correlation determined by said correlation determining means; and a phase determining circuit determining phases of demodulating operations of said spread spectrum demodulators so that the multipath signals selected by said selecting means undergo demodulation in said spread spectrum demodulators, respectively.

2. A spread spectrum receiver as set forth in claim 1, wherein said correlation determining means determines a cross-correlation value in each of all possible combinations of any two of the multipath signals, and wherein said selecting means selects as many multipath signals as the number of said spread spectrum demodulators in the order of showing a smaller cross-correlation value and a greater power level.

3. A spread spectrum receiver as set forth in claim 2, wherein said selecting means removes a smaller in power level of one of said combinations showing the greatest cross-correlation value to select as many multipath signals as the number of said spread spectrum demodulators.

4. A spread spectrum receiver as set forth in claim 3, wherein if there are left the multipath signals greater in number than said spread spectrum demodulators after the smaller in power level of one of said combinations showing the greatest cross-correlation value is removed, a smaller in power level of one of said combinations showing the second greatest cross-correlation value is removed to select as many multipath signals as the number of said spread spectrum demodulators.

5. A spread spectrum receiver as set forth in claim 1, wherein said correlation determining means determines a co-variance value in each of all possible combinations of any two of the multipath signals, and wherein said selecting means selects as many multipath signals as the number of said spread spectrum demodulators in the order of showing a smaller co-variance value and a greater power level.

6. A spread spectrum receiver as set forth in claim 5, wherein said selecting means removes a smaller in power level of one of said combinations showing the greatest co-variance value to select as many multipath signals as the number of said spread spectrum demodulators.

7. A spread spectrum receiver as set forth in claim 1, wherein said correlation determining means determines a correlation factor in each of all possible combinations of any two of the multipath signals, and wherein said selecting means selects as many multipath signals as the number of said spread spectrum demodulators in the order of showing a smaller correlation factor and a greater power level.

8. A spread spectrum receiver as set forth in claim 7, wherein said selecting means removes a smaller in power level of one of said combinations showing the greatest correlation factor to select as many multipath signals as the number of said spread spectrum demodulators.

9. A spread spectrum receiver as set forth in claim 1, wherein said selecting means includes a combined level calculator and a worst signal combination determining circuit, said combined level calculator determining the sum of the power levels in each of all possible combinations of the same number of the multipath signals as that of said spread spectrum demodulators to provide a total power level, said worst signal combination determining circuit determining frequencies of drops in total power level of said combinations below a given level to select as many multipath signals as the number of said spread spectrum demodulators in the order of showing a lower frequency and a greater power level.

10. A spread spectrum receiver as set forth in claim 9, wherein said selecting means determines and excludes one of said combinations showing the highest frequency to select as many multipath signals as the number of said spread spectrum demodulators ultimately.

11. A spread spectrum receiver as set forth in claim 1, wherein said selecting means includes a combined level calculator and a variance calculator, said combined level calculator determining the sum of the power levels in each of all possible combinations of the same number of the multipath signals as that of said spread spectrum demodulators to provide a total power level, said variance calculator determining variance values of the total power levels of said combinations over a given sampling cycle to select as many multipath signals as the number of said spread spectrum demodulators in the order of showing a smaller variance value and a greater power level.

12. A spread spectrum receiver as set forth in claim 11, wherein said selecting means determines and excludes one of said combinations showing the greatest variance value to select as many multipath signals as the number of said spread spectrum demodulators ultimately.

13. A spread spectrum receiver as set forth in claim 1, wherein said correlation determining means determines a time difference between times at which minimum values in each of all possible combinations of any two of the multipath signals appear, and wherein said selecting means selects as many multipath signals as the number of said spread spectrum demodulators in the order of showing a greater time difference and a greater power level.

14. A spread spectrum receiver as set forth in claim 13, wherein said selecting means determines and excludes one of said combinations showing a smaller time difference in sequence to select as many multipath signals as the number of said spread spectrum demodulators.

15. A spread spectrum receiver for use in a communication system comprising:

a plurality of spread spectrum demodulators demodulating inputted multipath signals transmitted through multiple transmission paths in the form of spread spectrum waves having different phases to provide demodulated signals, respectively;

a diversity combiner combining the demodulated signals to produce a diversity combined signal;

a power level detector detecting power levels of the multipath signals, respectively;

correlation determining means for determining correlation among the multipath signals; and a phase determining circuit selecting the same number as that of said spread spectrum demodulators out of the multipath signals, which minimizes a drop in power level of the diversity combined signal according to the correlation determined by said correlation determining means, said phase determining circuit determining phases of demodulating operations of said spread spectrum demodulators so that the multipath signals selected thereby undergo demodulation in said spread spectrum demodulators, respectively.

\* \* \* \* \*